No. 680,315. Patented Aug. 13, 1901.
E. B. COLLINS.
FLEXIBLE SHAFTING.
(Application filed Oct. 31, 1900.)
(No Model.)
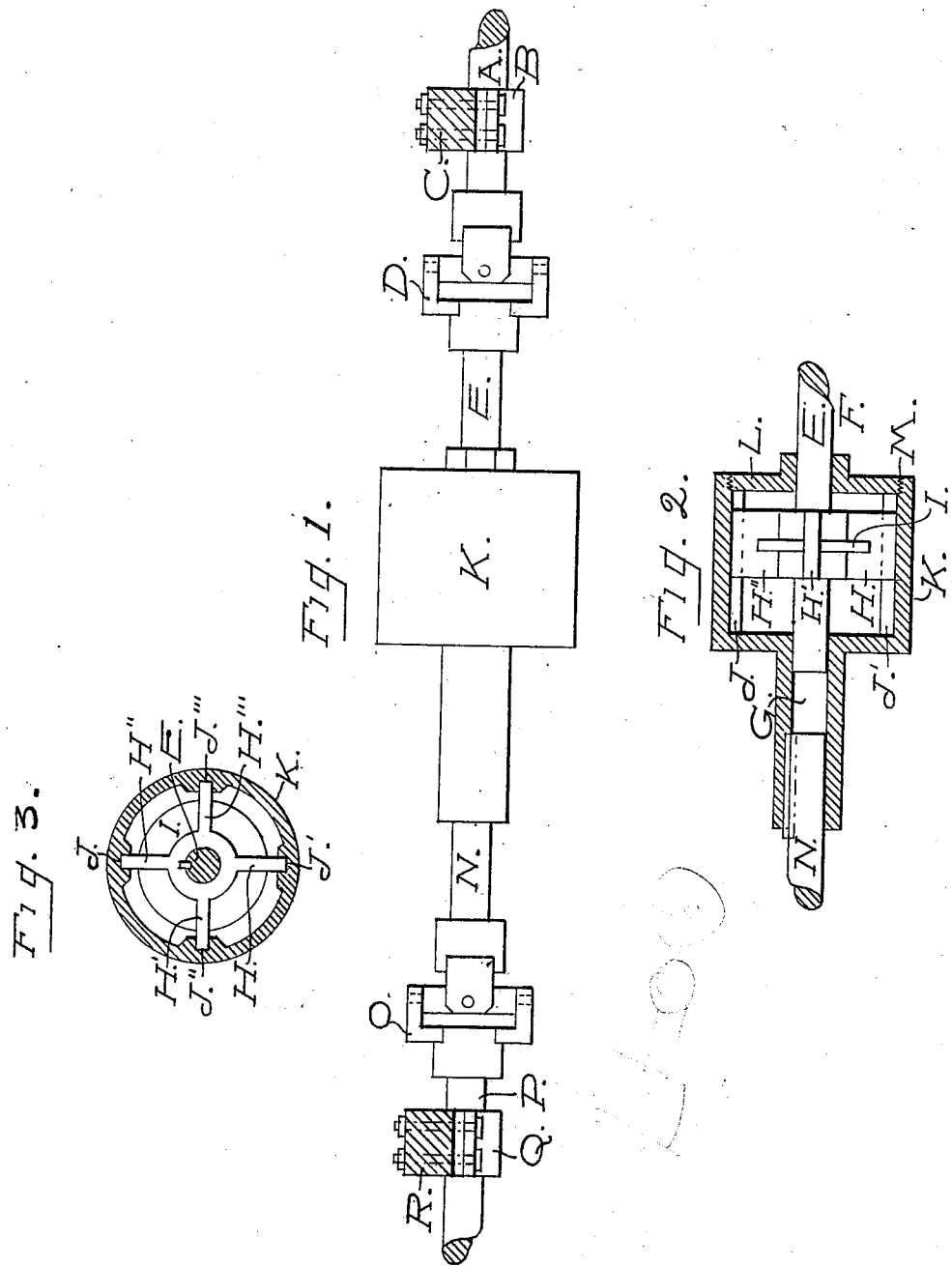
WITNESSES:
INVENTOR
Edson B. Collins

UNITED STATES PATENT OFFICE.

EDSON B. COLLINS, OF CHICAGO, ILLINOIS.

FLEXIBLE SHAFTING.

SPECIFICATION forming part of Letters Patent No. 680,315, dated August 13, 1901.

Application filed October 31, 1900. Serial No. 35,057. (No model.)

*To all whom it may concern:*

Be it known that I, EDSON B. COLLINS, a citizen of the United States, residing in Chicago, in the county of Cook and State of Illinois, have invented a new and useful Flexible Shafting, of which the following is a specification.

My invention relates to improvements in flexible shafting, in which a shaft with one or more arms attached, sliding within a cylinder or box grooved to correspond with the said arms, works in conjunction with shafting carrying two universal joints; and the object of my improvement is to provide a device by which power may be more efficiently conveyed by means of a shaft from one body or mechanism to another and still allow within limited distances perfect freedom and independence of motion between the two bodies or mechanisms—as, for instance, between the bed, which may be on springs, and the running-gear of a motor-vehicle. I attain this object by the mechanism illustrated in the accompanying drawings, in which—

Figure 1 is a side view of the apparatus. The bearing supported by the one mechanism is shown at B. The bearing supported by the other mechanism is shown at Q. Fig. 2 is a sectional side view of the grooved cylinder or box, showing the shaft with arms attached. Fig. 3 is a transverse sectional view of grooved cylinder or box, showing end view of shaft with arms attached.

Similar letters refer to similar parts throughout the several views.

The shaft A, connected with the source of power, passes through the bearing B, which is attached to the bed of carriage-body C. The shaft A is attached to any suitable universal joint D, which in turn is attached to the shaft E, which slides within the bushings F and G and has rigidly attached to it the arms H H' H'' H''', which are strengthened by the web I and slide in the grooves J J' J'' J''' in the direction of the shaft within the cylinder or box K and all revolving together. The end L of cylinder or box is secured by means of screw-threads M or other suitable manner, so that it can be easily removed, allowing the shaft E, with attached arms, to be removed from cylinder or box. The cylinder or box K in turn is attached rigidly to shaft N, which is attached to universal joint O, which in turn is attached to shaft P, running in bearing Q, supported by running-gear of motor-vehicle R.

The bushings F and G serve to hold the shafting E and N straight between the two universal joints D and O.

The shaft P is supported and held in position and caused to move with the body to which the power is to be applied—as, for example, the running-gear of a motor-vehicle—by the bearing Q, and by appropriate gearing or other device conveys the power directly to this mechanism. Thus it can be seen that there can be within certain limits perfectly free and independent motion between the two bearings B and Q thus connected by this shafting.

I claim as my sole and original invention—

1. The combination with a shaft, of a box rigidly mounted thereon and provided with internal grooves, and a second shaft provided with arms or extensions fitting said grooves and upon which shaft the box is slidably mounted, substantially as described.

2. The combination with a shaft, of a box rigidly mounted thereon and provided with internal grooves, a second shaft provided with arms or extensions fitting said grooves and upon which shaft the box is slidably mounted, a driving-shaft and a driven shaft and universal joints between the driving and the driven shafts and said first-mentioned shafts, respectively, substantially as set forth.

3. The combination of the universal joints D and O, the shaftings E, and N, the box K, the plate L, the extensions or arms H, H', H'', H''', substantially as set forth.

4. The combination with two universal joints, and a section of shafting connecting them, of a sliding joint in said section of shafting adapted to permit said universal joints to approach or recede from each other.

5. The combination with a shaft, of a box rigidly mounted thereon and provided with one or more internal grooves, a second shaft provided with one or more arms or extensions fitting said groove or grooves and upon which shaft the box is slidably mounted, a driving-shaft and a driven shaft and universal joints between the driving and the driven shafts and said first-mentioned shafts respectively, substantially as set forth.

In testimony whereof I have signed my name to this specification in the presence of two witnesses.

EDSON B. COLLINS.

Witnesses:
JOHN M. SCHROEDER,
ALVAH CAMP.